(12) United States Patent
Yamauchi et al.

(10) Patent No.: US 11,418,042 B2
(45) Date of Patent: Aug. 16, 2022

(54) BATTERY MANAGEMENT UNIT

(71) Applicant: HITACHI AUTOMOTIVE SYSTEMS, LTD., Hitachinaka (JP)

(72) Inventors: Tatsumi Yamauchi, Hitachinaka (JP); Hikaru Miura, Hitachinaka (JP); Mutsumi Kikuchi, Hitachinaka (JP); Akihiro Machida, Hitachinaka (JP); Masahiro Ueda, Hitachinaka (JP); Kenichiro Tsuru, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 80 days.

(21) Appl. No.: 16/970,009

(22) PCT Filed: Jan. 18, 2019

(86) PCT No.: PCT/JP2019/001384
§ 371 (c)(1),
(2) Date: Aug. 14, 2020

(87) PCT Pub. No.: WO2019/159598
PCT Pub. Date: Aug. 22, 2019

(65) Prior Publication Data
US 2021/0104902 A1 Apr. 8, 2021

(30) Foreign Application Priority Data
Feb. 15, 2018 (JP) .............................. JP2018-025496

(51) Int. Cl.
*H02J 7/00* (2006.01)
*B60L 58/15* (2019.01)
*B60L 58/14* (2019.01)

(52) U.S. Cl.
CPC .......... *H02J 7/00302* (2020.01); *B60L 58/14* (2019.02); *B60L 58/15* (2019.02); *H02J 7/0063* (2013.01);
(Continued)

(58) Field of Classification Search
CPC .. H02J 7/00302; H02J 7/00306; H02J 7/0063; H02J 7/00712; H02J 7/0031;
(Continued)

(56) References Cited

U.S. PATENT DOCUMENTS 9,065,291 B2 * 6/2015 Park ........................ B60L 58/15
9,340,122 B2 * 5/2016 Yamauchi ........... H01M 10/482
(Continued)

FOREIGN PATENT DOCUMENTS

CN 103283108 A * 9/2013 ............ H02J 7/0031
CN 205509592 U * 8/2016
(Continued)

OTHER PUBLICATIONS

Kawai et al., Battery Monitoring Device, Sep. 18, 2014, Japan Invention Application Publication (Source: IFI), Translation (Year: 2014).*
(Continued)

*Primary Examiner* — M Baye Diao
(74) *Attorney, Agent, or Firm* — Foley & Lardner LLP (57) ABSTRACT

A battery management unit capable of more reliably turning off a high-voltage relay. A battery management unit 1 includes a high-voltage relay 5 serving as a switch unit that turns on/off electrical connection between a high-voltage battery 102, which is a secondary battery, and an external device, and a power source IC 6 serving as a disconnection control unit having a first disconnection processing function of turning off the high-voltage relay 5 at the time of abnormality of the battery management unit 1 and a second
(Continued)

disconnection processing function of detecting an abnormality of the first disconnection processing function and turning off the high-voltage relay 5.

6 Claims, 9 Drawing Sheets

(52) U.S. Cl.
CPC ...... *H02J 7/00306* (2020.01); *H02J 7/00712* (2020.01)

(58) Field of Classification Search
CPC ........ B60L 58/14; B60L 58/15; B60L 3/0046; B60L 3/0092; B60L 58/21; B60L 3/04; H01M 2220/20; H01M 10/0525; H01M 10/425; H01M 10/48; Y02T 10/70; Y02E 60/10
USPC ........................................................ 320/134
See application file for complete search history.

(56) References Cited

U.S. PATENT DOCUMENTS

| | | | |
|---|---|---|---|
| 9,742,324 B2 * | 8/2017 | Fukuta | H02P 29/028 |
| 9,837,838 B2 * | 12/2017 | Li | H02J 7/0091 |
| 10,107,866 B2 * | 10/2018 | Kang | B60L 3/04 |
| 10,819,141 B2 * | 10/2020 | Sugiyama | H02J 7/0068 |
| 10,916,396 B2 * | 2/2021 | Shiozaki | H03K 17/12 |
| 2012/0065823 A1 | 3/2012 | Taguchi | |
| 2013/0338871 A1 | 12/2013 | Kubo | |

FOREIGN PATENT DOCUMENTS

| | | | | | |
|---|---|---|---|---|---|
| CN | 107839485 A | * | 3/2018 | | B60L 3/04 |
| JP | 2006-020380 A | | 1/2006 | | |
| JP | 2010-200553 A | | 9/2010 | | |
| JP | 2012-060842 A | | 3/2012 | | |
| JP | 2014-003742 A | | 1/2014 | | |
| JP | 2014-171285 A | | 9/2014 | | |
| KR | 20170002298 A | * | 1/2017 | | H02J 7/0031 |
| WO | WO-2018054378 A1 | * | 3/2018 | | B60L 53/11 |

OTHER PUBLICATIONS

International Search Report with English translation and Written Opinion issued in corresponding application No. PCT/JP2019/001384 dated Apr. 16, 2019.

* cited by examiner

BATTERY MANAGEMENT UNIT

TECHNICAL FIELD

The present invention relates to a battery management unit.

BACKGROUND ART

An electric vehicle and a hybrid vehicle use a battery module in which a plurality of assembled batteries in which a plurality of secondary battery cells such as lithium single cells (also referred to as single cells) are connected in series or in series parallel are further connected in series or in series parallel. A power storage device includes a plurality of battery modules connected in series or in series parallel, and a battery management unit that controls those battery modules.

Normally, a high-voltage relay for supplying and cutting off electric power is provided between a power storage device and an inverter control device for driving a motor. The high-voltage relay is provided on each of the positive side and the negative side of a power supply line. Depending on the system configuration, the relay is further provided with a precharge relay in which current-limiting resistors are connected in series or provided with a charger relay for charging a secondary battery.

In general, a vehicle equipped with a lithium-ion battery includes a system that prevents overcharging and overdischarging in order to use the lithium-ion battery safely. In recent years, there has been an increasing demand for vehicle safety as represented by the ISO 26262 standard. A vehicle equipped with a lithium-ion battery generally has a system configuration in which a high-voltage relay is turned off (OFF) if there is an abnormality in the power storage device (see PTL 1, for example).

CITATION LIST

Patent Literature

PTL 1: JP 2010-200553 A

SUMMARY OF INVENTION

Technical Problem

Conventionally, the high-voltage relay has been turn off by detecting an abnormality in the battery or the battery management unit; however there has been a problem that the high-voltage relay cannot be turned off when an abnormality occurs in the processing of turning off the high-voltage relay.

For example, in a system in which a microcomputer turns off a high-voltage relay by detecting overcharging of a battery cell, if the microcomputer becomes abnormal (abnormality such as runaway), a watchdog timer function that monitors the operation of the microcomputer works to reset the microcomputer.

The high-voltage relay is turned off by resetting the microcomputer.

However, when a reset signal to the microcomputer is stuck to the high side (or the low side), the high-voltage relay cannot be turned off.

Solution to Problem

According to one aspect of the present invention, a battery management unit includes a switch unit that turns on/off electrical connection between a battery and an external device, a disconnection control unit that has a first disconnection processing function of turning off the switch unit at the time of abnormality in the battery management unit and a second disconnection processing function of detecting an abnormality of the first disconnection processing function and turning off the switch unit, and the battery management unit monitors and controls the battery.

Advantageous Effects of Invention

According to the present invention, even in a case of an abnormality of the conventional disconnection processing function of turning off the switch unit that turns on/off the electrical connection between the battery and the external device, the switch unit can be turned off by the second disconnection processing function.

DESCRIPTION OF EMBODIMENTS

Embodiments of the present invention will be described below with reference to the drawings.

First Embodiment

Figure 1:
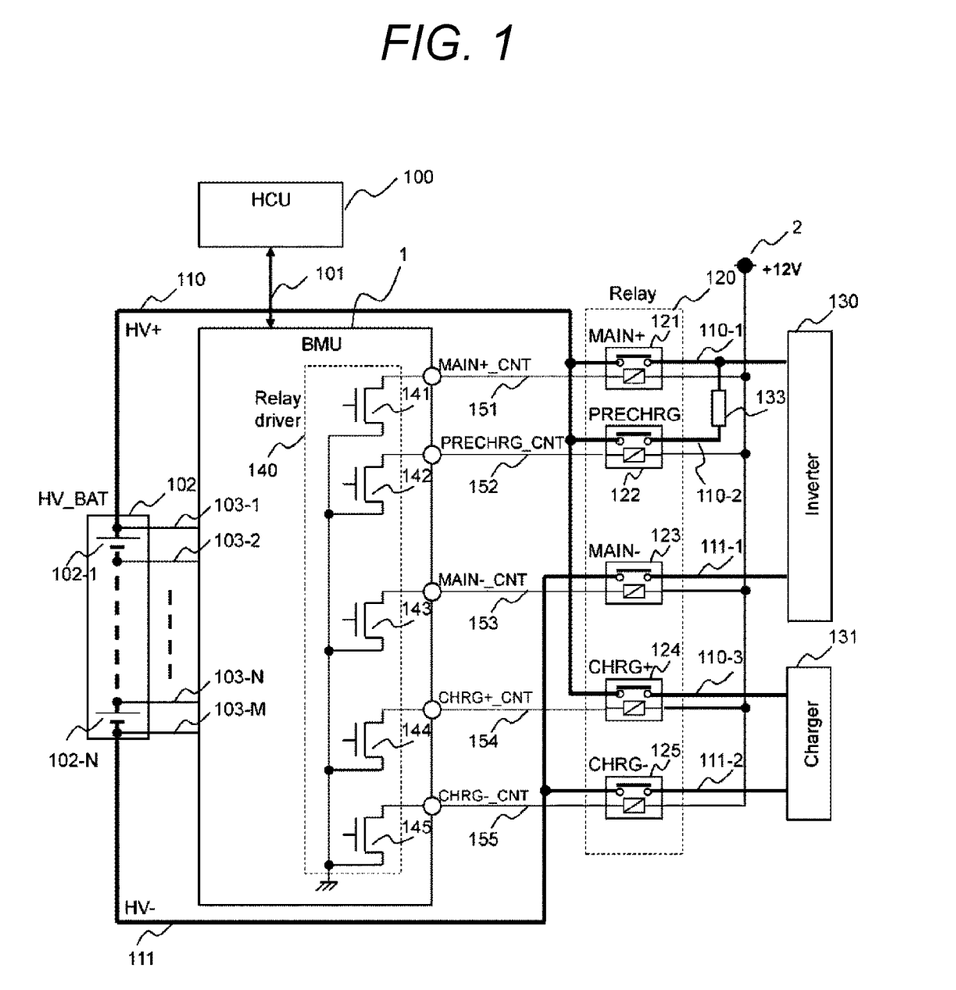
FIG. 1 is a diagram illustrating an example of a configuration of a battery management system.

FIG. 1 is a diagram illustrating an example of the configuration of a battery management system having a battery management unit (BMU) 1. The battery management system illustrated in FIG. 1 includes the battery management unit 1, a high-order controller 100, a high-voltage battery 102, and a high-voltage relay group 120. The high-voltage battery 102 is connected with an inverter 130 and a charger 131 which are external devices.

The battery management unit 1 communicates with the high-order controller 100 via a communication line 101. The high-voltage battery 102 is composed of a plurality of single batteries (also referred to as battery cells). In the example illustrated in FIG. 1, the high-voltage battery 102 is composed by connecting N single batteries 102-1 to 102-N in series. The voltage of each single battery 102-1 to 102-N is detected by the battery management unit 1 using voltage detection lines 103-1, 103-2 to 103-N, and 103-M.

The high-voltage battery 102 is connected with the inverter 130 and the charger 131 via the high-voltage relay group 120. The high-voltage relay group 120 is provided with a main positive relay 121, a precharge relay 122, a main negative relay 123, a charger positive relay 124, and a charger negative relay 125. The positive side of the high-voltage battery 102 is connected to the main positive relay 121, the precharge relay 122, and the charger positive relay 124 by a battery-side high-voltage positive wiring line 110. The negative side of the high-voltage battery 102 is connected to the main negative relay 123 and the charger negative relay 125 by a battery-side high-voltage negative wiring line 111.

The main positive relay 121 and the main negative relay 123 are connected to the inverter 130 by a load-side high-voltage positive wiring line 110-1 and a load-side high-voltage negative wiring line 111-1. A load-side high-voltage positive wiring line 110-2 of the precharge relay 122 is connected to the load-side high-voltage positive wiring line 110-1 of the main positive relay 121 via a precharge resistor 133. The charger positive relay 124 and the charger negative relay 125 are connected to the charger 131 by a load-side high-voltage positive wiring line 110-3 and a load-side high-voltage negative wiring line 111-2. Some vehicle systems do not have the charger 131 and the relays 124 and 125 for the charger.

The battery management unit 1 is provided with a relay driver group 140 composed of FETs 141, 142, 143, 144, and 145. ON/OFF (i.e., connecting and cutting off) of the main positive relay 121 is controlled by the FET 141 via a coil current line 151. ON/OFF of the precharge relay 122 is controlled by the FET 142 via a coil current line 152. ON/OFF of the main negative relay 123 is controlled by the FET 143 via a coil current line 153. ON/OFF of the charger positive relay 124 is controlled by the FET 144 via a coil current line 154. ON/OFF of the charger negative relay 125 is controlled by the FET 145 via a coil current line 155. The coil current lines 151 to 155 are connected to a low-voltage power source 2 of the vehicle.

Figure 2:
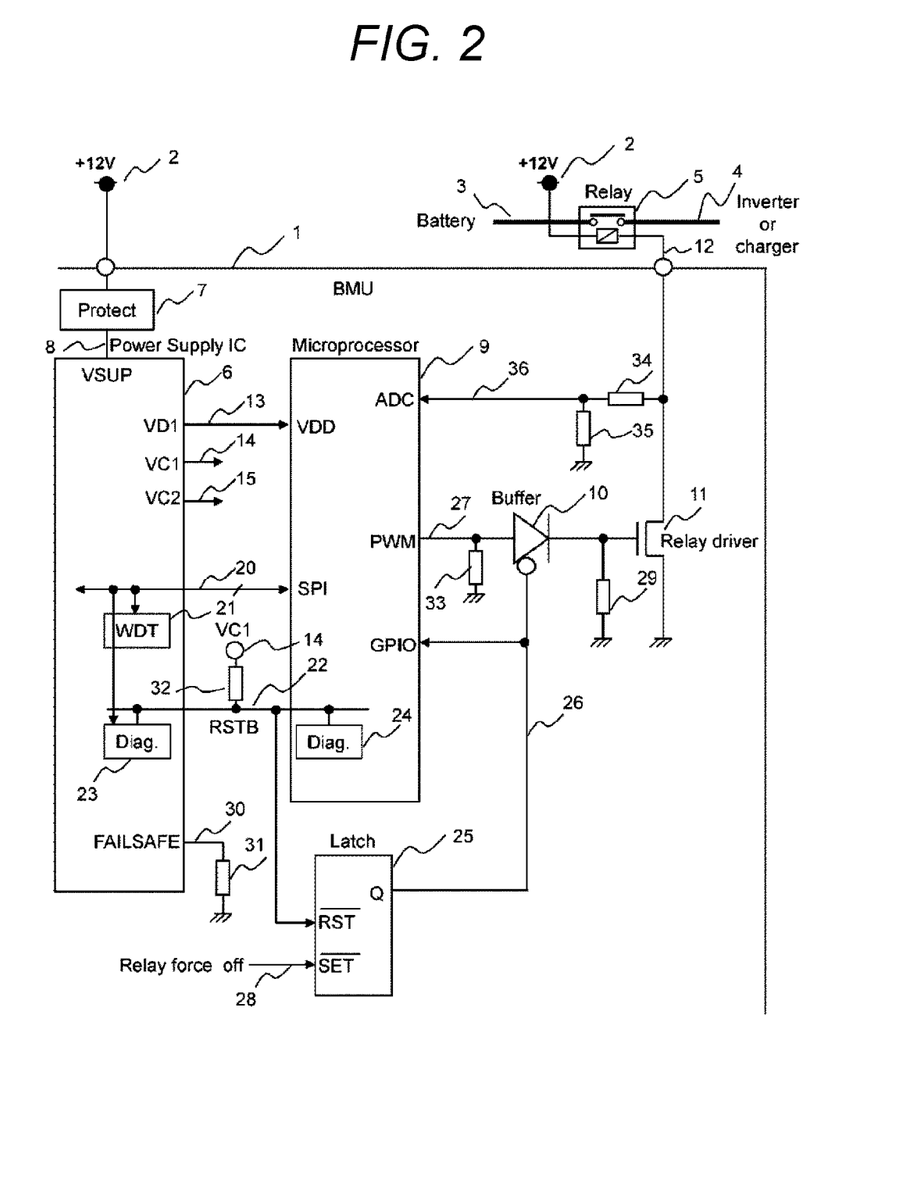
FIG. 2 is a diagram explaining a control of a high-voltage relay.

FIG. 2 is a diagram explaining the control of the high-voltage relay by the battery management unit 1, and illustrates any one of the main positive relay 121, the precharge relay 122, the main negative relay 123, the charger positive relay 124, and the charger negative relay 125 that are provided in the high-voltage relay group 120 of FIG. 1. That is, a high-voltage relay 5 in FIG. 2 corresponds to any of the main positive relay 121, the precharge relay 122, the main negative relay 123, the charger positive relay 124, and the charger negative relay 125 that are provided in the high-voltage relay group 120 of FIG. 1, and a relay driver 11 corresponds to any of the FETs 141 to 145 provided in the relay driver group 140 in FIG. 1.

For example, when the high-voltage relay 5 is used as the main positive relay 121, the relay driver 11 represents the FET 141. A high-voltage battery-side wiring line 3 and a load-side wiring line 4 are connected to the high-voltage relay 5. The high-voltage battery-side wiring line 3 corresponds to any of the wiring lines 110 and 111 of FIG. 1, and the load-side wiring line 4 corresponds to any of the wiring lines 110-1, 110-2, 110-3, 111-1, and 111-2 of FIG. 1.

A microcomputer 9 performs arithmetic processing in the battery management unit 1. A buffer circuit 10 drives the relay driver 11 in response to an instruction from the microcomputer 9. When the relay driver 11 is turned on (or increases a PWM duty), the current of the relay coil line 12 is increased, and the high-voltage relay 5 is turned on. Conversely, when the relay driver 11 is turned off (or reduces the PWM duty), the current of the relay coil line 12 is reduced, and the high-voltage relay 5 is turned off.

A power source IC 6 supplies power to the microcomputer 9 and other circuits via power supply lines 13, 14, and 15. The low-voltage power source 2 of the vehicle is supplied to the power source IC 6 via a power supply line 8 provided with a protection circuit 7. The protection circuit 7 protects the power source IC 6 from vehicle noise. A communication line 20 performs communication between the power source IC 6 and the microcomputer 9. A reset signal 22 is a signal for resetting the microcomputer 9. In the present embodiment, when the reset signal 22 is asserted low and changed to the low state from the high state by a diagnosis circuit 23 of the power source IC 6, the microcomputer 9 receiving the reset signal 22 is reset. A diagnosis circuit 24 built in the microcomputer 9 also performs diagnosis of an abnormality of the reset signal 22. Depending on the type of microcomputer, the microcomputer 9 may be configured to generate a signal for resetting itself.

A watchdog timer 21 built in the power source IC 6 constantly monitors the operation of the microcomputer 9. The microcomputer 9 periodically refreshes the watchdog timer 21 in the power source IC via the communication line 20. The communication line 20 is also used when the microcomputer 9 reads a diagnostic abnormality flag or the like in the power source IC 6. When the refresh of the watchdog timer 21 is stopped due to an abnormality of the microcomputer 9, the power source IC 6 judges that the microcomputer 9 has an abnormality after a certain period of time has elapsed, changes the reset signal 22 from the high state to the low state to reset the microcomputer 9, and attempts to restore the microcomputer 9.

Here, the reason why the judgment of the microcomputer abnormality is performed after a certain period of time has elapsed from when the refresh is stopped is that a judgment time for reliably determining that it is a microcomputer failure should be ensured. The certain period of time is set in a range of about several milliseconds to several seconds by the system.

When a PWM output 27 becomes an initial value (low) by the reset of the microcomputer 9, the relay driver 11 is turned off. As a result, the current flowing through the coil of the high-voltage relay 5 is cut off, and the high-voltage relay 5 is turned off.

The reset signal 22 is also input to a latch circuit 25. When the reset signal 22 is asserted low from the high state to the low state, a latch output signal 26 becomes in the low state, and the latch circuit 25 outputs a signal in which the output of the buffer circuit 10 is the PWM signal 27. In this case, since the microcomputer 9 has been reset, the PWM output is low. As a result, a gate voltage of the relay driver 11 becomes low, the relay driver 11 is turned off, the current flowing through the coil of the high-voltage relay 5 is cut off, and the high-voltage relay 5 is turned off. The latch circuit 25 can set the latch output signal 26 to the high state also by a forced relay OFF signal 28. That is, when the forced relay OFF signal 28 is input, the latch circuit 25 sets the latch output signal 26 to the high state, and sets the output of the buffer circuit 10 to have a high impedance.

In this manner, the battery management unit 1 is configured that when the microcomputer 9 is reset (at the time of reset of the microcomputer), the high-voltage relay 5 is turned off. Also, at the time of stop of the power supply in which power supply from the power supply lines 13 to 15 is stopped, the gate voltage of the relay driver 11 is reduced similarly to the time of reset of the microcomputer, and hence the high-voltage relay 5 is turned off. The power source IC 6 has an output of a fail-safe signal 30, but in the present embodiment, as illustrated in FIG. 2, it is pulled down by a pull-down resistor 31 and is not used. Circuit elements denoted by numerals 32, 33, 34, and 35 are resistors. The microcomputer 9 monitors a drain voltage of the relay driver 11 by an AD input 36.

In recent years, from the point of view of functional safety, it has become a problem whether the battery system can be safely stopped when there is an abnormality in the battery system. Normally, in the battery management system as illustrated in FIG. 1, when the battery management unit 1 detects overcharging or overdischarging of the high-voltage battery 102, the high-voltage relay 5 is turned off to stop charging or discharging the high-voltage battery 102, and the battery management system is shifted to the safe state. In this case, the microcomputer 9 operates so as to set the PWM output 27 to a low output and turn off the high-voltage relay 5.

If the battery management unit 1 has an abnormality, the high-voltage relay 5 is turned off by the following disconnection processing. That is, when the microcomputer 9 has an abnormality and the watchdog timer 21 in the power source IC 6 cannot be refreshed, the power source IC 6 asserts low the reset signal 22 to reset the microcomputer 9 and shifts the high-voltage relay 5 to OFF.

However, in the conventional battery management system, if there is an abnormality in a path for resetting the microcomputer 9, there is a problem that the microcomputer 9 cannot be reset and the high-voltage relay 5 cannot be turned off.

Figure 3:
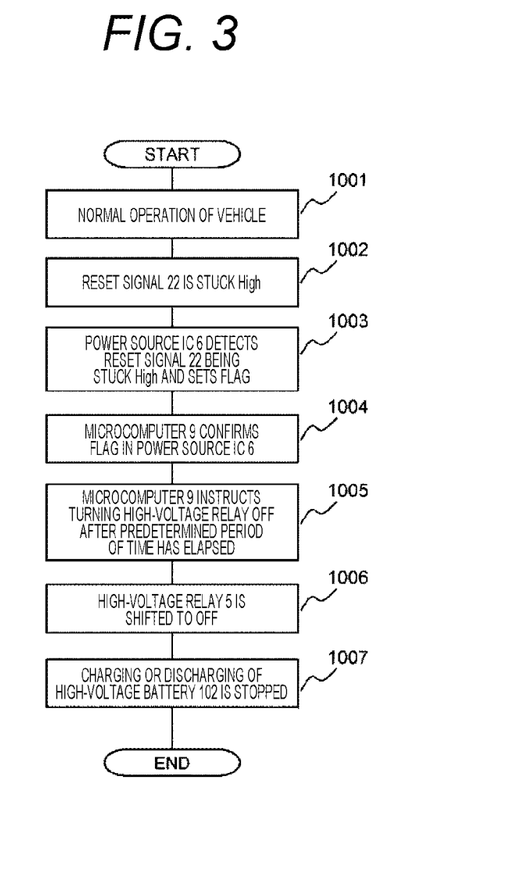
FIG. 3 is a flowchart for explaining a first example of a second disconnection processing function.
Figure 4:
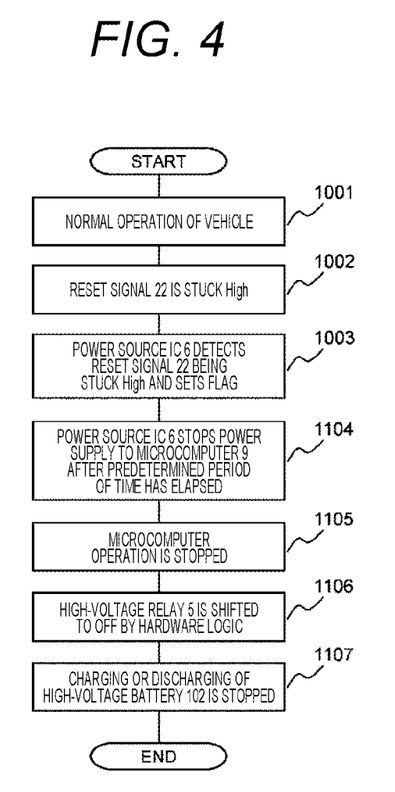
FIG. 4 is a flowchart for explaining a second example of the second disconnection processing function.

In the present embodiment, in order to solve the above-described problem, even if the high-voltage relay 5 cannot be turned off by the conventional disconnection processing function (hereinafter referred to as the first disconnection processing function) when an abnormality occurs in the battery management unit 1, the high-voltage relay 5 can be turned off by the second disconnection processing function described below. FIGS. 3 and 4 are flowcharts for explaining a specific example of the second disconnection processing function.

(First Example of Second Disconnection Processing Function)

First, a first example of the second disconnection processing function illustrated in FIG. 3 will be described.

Here, the disconnection processing in the case where an abnormality in which the reset signal 22 of the microcomputer 9 is stuck to the high side (1002) during a normal operation (1001) occurs will be described. In this case, the diagnosis circuit 23 in the power source IC 6 detects the reset signal 22 being stuck high and sets a flag in the power source IC 6 (1003). The details of the method of detecting the reset signal 22 being stuck high in the diagnosis circuit 23 will be described later.

When confirming the flag in the power source IC 6 via the communication line 20 (1004), the microcomputer 9 controls the PWM output 27 after a predetermined period of time has elapsed (1005), and turns off the high-voltage relay 5 (1006). Due to this, charging or discharging of the high-voltage battery 102 is stopped (1007), and the battery management system can be transitioned to the safe state. Here, the reason why the high-voltage relay 5 is turned off after the predetermined period of time has elapsed from the confirmation of the flag is that a judgment time for reliably determining that it is a microcomputer failure should be ensured, but the high-voltage relay 5 may be turned off before the predetermined period of time has elapsed. The predetermined period of time is set in a range of about several milliseconds to several seconds by the system.

(Second Example of Second Disconnection Processing Function)

Next, a second example of the second disconnection processing function will be described with reference to FIG. 4.

The second example is also the disconnection processing in the case where an abnormality in which the reset signal 22 of the microcomputer 9 is stuck to the high side (1002) during the normal operation (1001) occurs. As in the case of FIG. 3, the diagnosis circuit 23 in the power source IC 6 detects the reset signal 22 being stuck high and sets a flag in the power source IC 6 (1003).

If the set flag remains set until a predetermined period of time elapses, the power source IC 6 stops the power supply from the power supply lines 13 to 15 (1104). As a result, the microcomputer 9 stops operating (1105). Due to this, the high-voltage relay 5 is turned off by the hardware logic around the microcomputer (1106), and charging or discharging of the high-voltage battery 102 is finally stopped (1107). Although the power supply is stopped after a predetermined period of time has elapsed since the flag is set, the power supply may be stopped before the predetermined period of time has elapsed. The method of stopping the power supply in the step 1104 described above includes a case in which the power source IC 6 itself is restarted or a case in which the operation is stopped by the sleeping of the power source IC 6.

Figure 5:
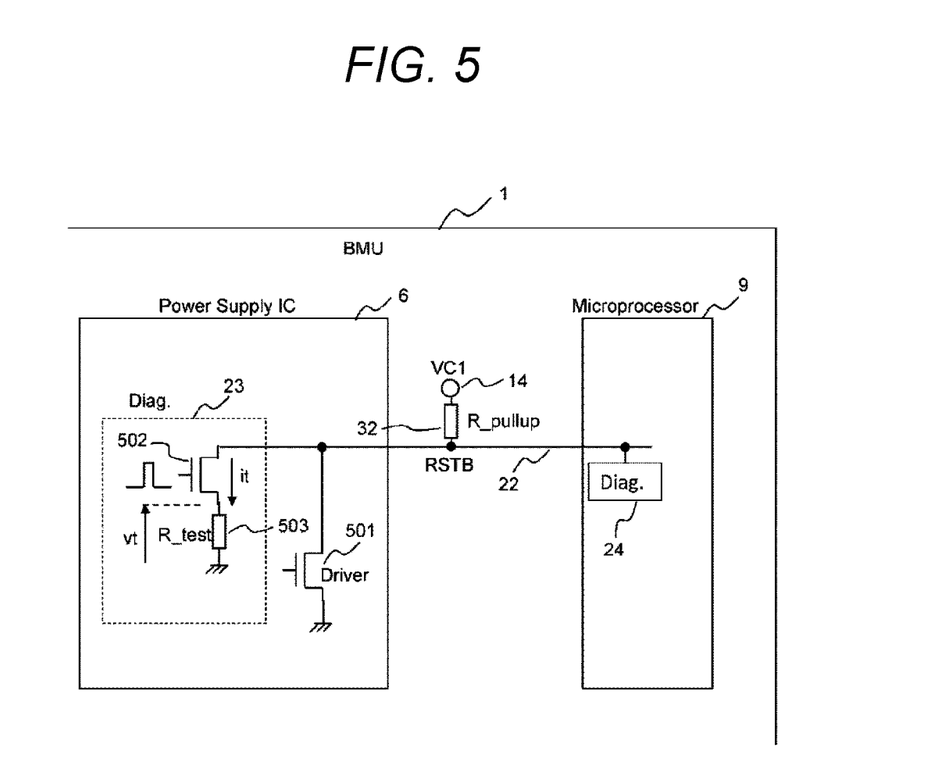
FIG. 5 is a diagram explaining an example of detection of a reset signal being stuck high.

(Method of detection of being stuck high) FIG. 5 is a diagram explaining an example of detection of the reset signal 22 being stuck high by the power source IC 6. A driver 501 for driving the reset signal 22 to the low level is provided in the power source IC 6. The diagnosis circuit 23 is provided with a diagnosis driver 502 for testing whether the reset signal 22 is stuck high, and a current detection resistor 503 for detecting a current flowing through the diagnosis driver 502. The diagnosis circuit 23 executes diagnostic processing at a predetermined interval.

The diagnosis driver 502 is in the OFF state at the time of non-diagnosis, and the diagnosis driver 502 is in the ON state for a short period of time at the time of diagnosis. When the diagnosis driver 502 is turned on, a current it flows through the current detection resistor 503. The diagnosis circuit 23 detects a voltage vt (voltage divided by a pull-up resistor 32 and the current detection resistor 503) applied to the current detection resistor 503 at this time, and calculates the current it by the equation (1). R_test is the resistance value of the current detection resistor 503.

$$it = vt/R\_test \qquad (1)$$

Then, a resistance value R_pullup of the pull-up resistor 32 is calculated by the equation (2). Let it in the case where the reset signal 22 is normal be it (normal), and let it in the case where the reset signal 22 is stuck high be it (stuck high), it (normal)<it (stuck high) is true, and hence VC1/it (normal)>VC1/it (stuck high) is true for the first term on the right side of the equation (2). VC1 is a supply voltage by the power supply line 14. An R_short determination threshold value for determining of being stuck high is set in advance, and when the resistance value R_pullup calculated by the equation (2) satisfies a conditional equation (3), the reset signal 22 is determined to be stuck high. In this case, since the microcomputer 9 actually shifts to the reset operation if the ON time of the diagnosis driver 502 is long, the ON time needs to be a short period of time to an extent that the microcomputer 9 is not reset.

$$R\_pullup = VC1/it\text{-}R\_test \quad (2)$$

$$R\_pullup < R\_short \text{ determination threshold value} \quad (3)$$

Figure 6:
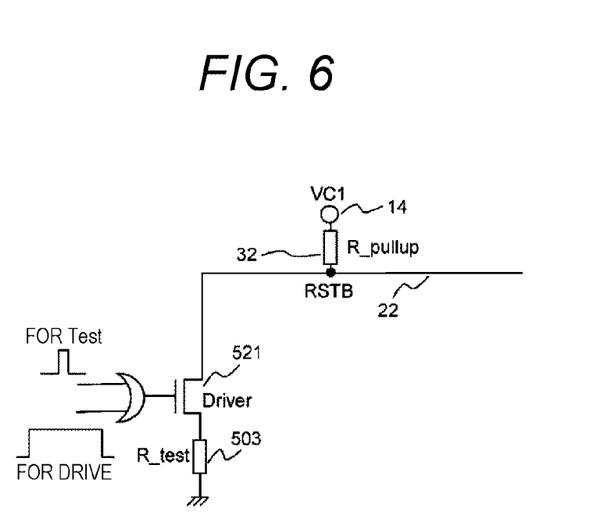
FIG. 6 is a diagram illustrating an example of a driver used both for diagnosis and low assertion.

As illustrated in FIG. 6, the diagnosis driver 502 and the driver 501 illustrated in FIG. 5 may be realized by one driver 521. In this case, the gate drive pulse of the driver 521 is set to be a short period of time (pulse for testing) at the time of diagnosis, and to be a long period of time (pulse for driving) when the microcomputer 9 is caused to perform a reset operation.

In the above-described first and second examples, the case where the reset signal 22 is normally pulled up to the high and the reset operation is performed at low has been described, but the present invention is also applicable to a configuration in which the reset signal 22 is always pulled down to the low level and the reset signal 22 is set to the high, thereby resetting the microcomputer 9. In that case, the diagnosis circuit 23 is configured to detect an abnormality of the reset signal 22 being stuck low.

The battery management unit 1 of the first embodiment configured as described above achieves the following operations and effects.

(1) The battery management unit 1 includes the high-voltage relay 5 which turns on/off the electrical connection between the high-voltage battery 102 which is a secondary battery and the inverter 130 illustrated in FIG. 1, and the power source IC 6 and the microcomputer 9 of FIG. 2 which have the first disconnection processing function of turning off the high-voltage relay 5 at the time of abnormality of the battery management unit 1 and the second disconnection processing function of detecting the abnormality of the first disconnection processing function and turning off the high-voltage relay 5.

The inverter 130 is an external device, the high-voltage relay 5 is a switch unit, and the power source IC 6 and the microcomputer 9 are disconnection control units.

The first disconnection processing function is disconnection processing of asserting low the reset signal 22, resetting the microcomputer 9, and shifting the high-voltage relay 5 to OFF when the microcomputer 9 has an abnormality and the watchdog timer 21 in the power source IC 6 cannot be refreshed. If the microcomputer 9 cannot be reset due to an abnormality occurring in the first disconnection processing function, the power source IC 6 performs the second disconnection processing of detecting the abnormality of the first disconnection processing function and turning off the high-voltage relay 5.

As described above, by providing the power source IC 6 and the microcomputer 9 (disconnection control unit) which perform the first disconnection processing function and the second disconnection processing function, the high-voltage relay 5 can be turned off by the second disconnection processing function even when an abnormality occurs in the first disconnection processing function of turning off the high-voltage relay 5. Therefore, the processing of safely stopping the battery system at the time of an abnormality can be performed more reliably.

(2) The microcomputer 9 has a function of detecting overcharging and overdischarging of the high-voltage battery 102, and the power source IC 6 has a function as a microcomputer monitor device that monitors the microcomputer 9. As the second disconnection processing function, the power source IC 6 detects an abnormality of the first disconnection processing function, which is, in the example of the embodiment, an abnormality of being stuck high of the reset signal 22 illustrated in FIG. 3, and sets a flag, and the microcomputer 9 detects the flag and causes the high-voltage relay 5 to perform an off operation. Therefore, even if an abnormality occurs in the first disconnection processing function, the high-voltage relay 5 can be reliably turned off by the second disconnection processing function.

(3) Further, the microcomputer 9 has the function of detecting overcharging and overdischarging of the high-voltage battery 102, and the power source IC 6 has the function as a microcomputer monitor device that monitors the microcomputer 9. As the second disconnection processing function, the power source IC 6 stops power supply to the microcomputer 9. In the example of the embodiment, as illustrated in FIG. 4, as the second disconnection processing function, an abnormality of the first disconnection processing function of the reset signal 22 being stuck high is detected, a flag is set, and power supply to the microcomputer 9 is stopped. As described above, the power supply stop here includes the power supply stop caused by the restart of the power source IC 6 and the operation stop by the sleep. Therefore, even if an abnormality occurs in the first disconnection processing function, the high-voltage relay 5 can be reliably turned off by the second disconnection processing function.

Second Embodiment

Figure 7:
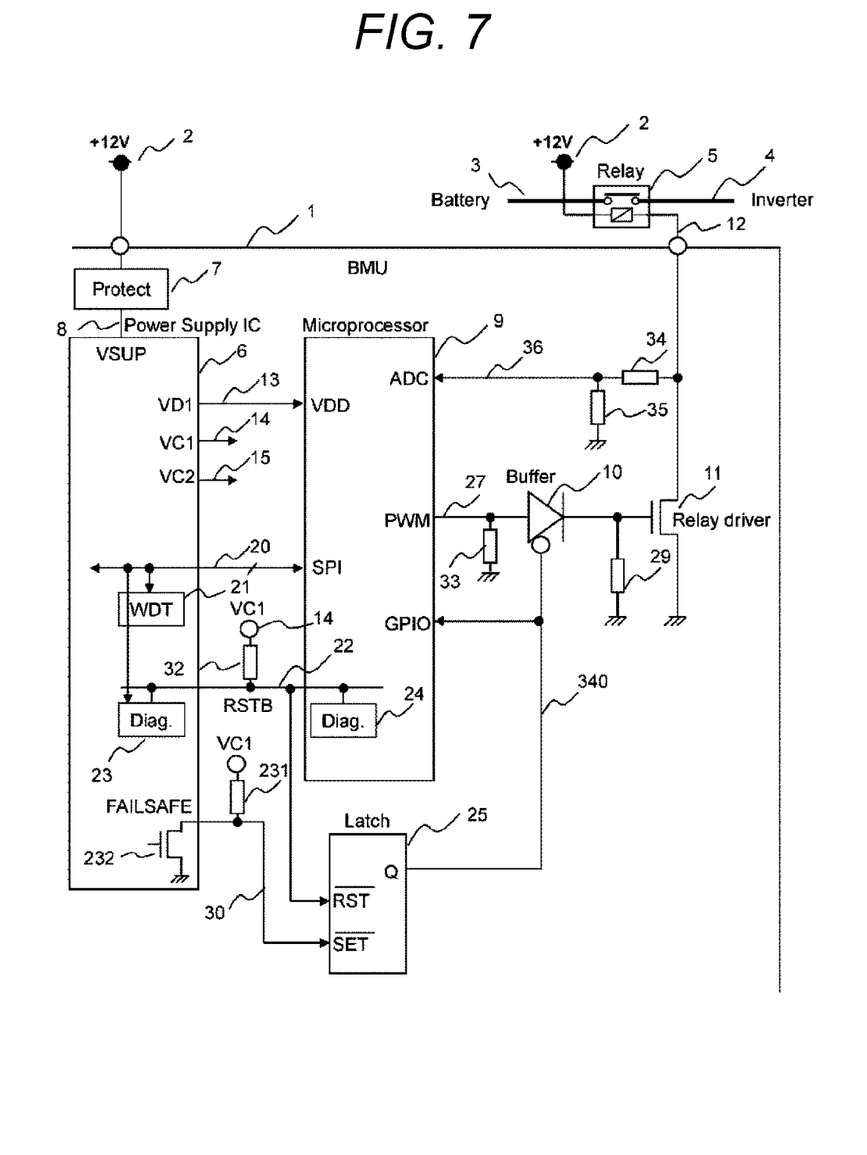
FIG. 7 is a diagram illustrating a second embodiment.

FIG. 7 is a diagram illustrating the second embodiment of the battery management unit. In the second disconnection processing function presented in the first and second examples described above, the high-voltage relay 5 is turned off by the instruction of the microcomputer 9 or by stopping the operation of the microcomputer 9, when an abnormality occurs in the first disconnection processing function using the reset signal 22. In the second embodiment described below, on the other hand, the high-voltage relay 5 is turned off by using the fail-safe signal 30 of the power source IC 6 not via the microcomputer 9, when an abnormality occurs in the first disconnection processing function.

As illustrated in FIG. 7, the fail-safe signal 30 is pulled up by a pull-up resistor 231. When detecting an abnormality of the first disconnection processing function by the microcomputer 9, the power source IC 6 can assert low the fail-safe signal 30 by turning a driver 232 on. When the fail-safe signal 30 is asserted low, an output 340 of the latch circuit 25 is set to high. As a result, the output of the buffer circuit 10 has a high impedance, the relay driver 11 is turned off because the gate signal is pulled down by a pull-down resistor 29, and finally the high-voltage relay 5 is turned off. Other configurations of the battery management unit 1 are the same as those of the battery management unit 1 illustrated in FIG. 2.

The abnormality of the first disconnection processing function is, for example, the reset signal 22 being stuck high.

As described above, the battery management unit of the second embodiment is configured as illustrated in FIG. 7, and use of the fail-safe signal 30 allows the high-voltage relay 5 to be turned off without the operation of the microcomputer 9. In this case, since the high-voltage relay 5 can be turned off not via the microcomputer 9, there is an advantage that the battery management unit can be quickly shifted to a safe state and control can be simplified.

Figure 8:
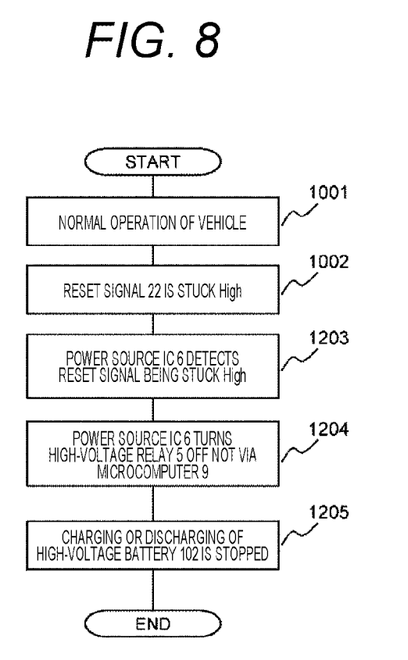
FIG. 8 is a diagram explaining disconnection processing when a fail-safe signal is used.

FIG. 8 is a flowchart of the disconnection processing when the high-voltage relay 5 is turned off by using the fail-safe signal 30 as illustrated in FIG. 7. The second disconnection processing function when the reset signal 22 is stuck high will be described with reference to FIG. 8. When the reset signal 22 is stuck high (1002) during the normal operation of the vehicle (1001), as the second disconnection processing function, the power source IC 6 detects the reset signal 22 being stuck high (1203), and asserts the fail-safe signal 30 low to set the output 340 of the latch circuit 25 high (1204). As a result, the output of the buffer circuit 10 has a high impedance, and the high-voltage relay 5 is turned off. That is, the power source IC 6 turns off the high-voltage relay 5 not via the microcomputer 9. Charging or discharging of the high-voltage battery 102 is stopped by turning off the high-voltage relay 5 (1205).

In many cases, the processing of step 1204 is executed after the state of step 1203 (the reset signal 22 being stuck high) continues for a certain period of time. Thereafter, charging or discharging of the high-voltage battery 102 is prohibited by the processing of step 1205.

The battery management unit of the second embodiment has the following operations and effects by the configuration of FIG. 7. The battery management unit includes the microcomputer 9 that detects overcharging and overdischarging of the high-voltage battery 102, and the power source IC 6 as a microcomputer monitor device that monitors the microcomputer 9, and, as the second disconnection processing function, the power source IC 6 detects an abnormality of the first disconnection processing function and causes the high-voltage relay 5 to perform an off operation not via the microcomputer 9. For example, as illustrated in FIG. 8, as the second disconnection processing function, the power source IC 6 detects an abnormality of the first disconnection processing function of being stuck high of the reset signal 22, and asserts low the fail-safe signal 30, thereby causing the high-voltage relay 5 to perform an off operation.

As a result, as in the case of the first embodiment, even when an abnormality occurs in the first disconnection processing function of turning off the high-voltage relay 5, the high-voltage relay 5 can be turned off by the second disconnection processing function, and the processing of safely stopping the battery system at the time of abnormality can be performed more reliably.

Furthermore, in the second embodiment, the battery system can be shifted to a safe state by turning off the high-voltage relay 5 not via the microcomputer 9.

In addition, since execution by hardware is dominant, the microcomputer program is simplified as compared with that in the first embodiment. Moreover, since the microcomputer 9 does not make a judgment, the battery system can be shifted to a safe state more easily than in the case of the first embodiment.

Figure 9:
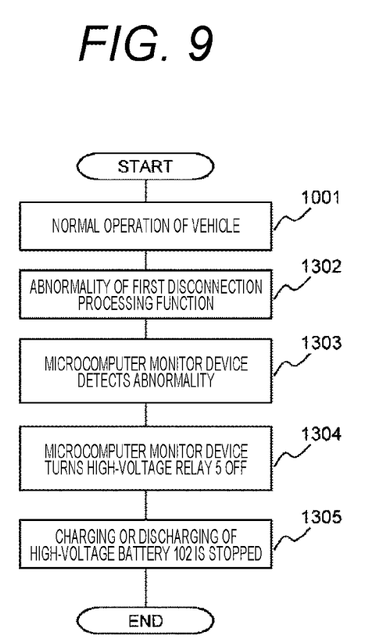
FIG. 9 is a diagram explaining disconnection processing when a microcomputer monitor device is provided.

In the first and second embodiments described above, the power source IC 6 has a function as a microcomputer monitor device, and detects an abnormality of the microcomputer 9 by the watchdog timer function to reset the microcomputer 9. Thus, use of the function of the power source IC 6 as the function of monitoring the microcomputer 9 can reduce the cost of the microcomputer monitoring function. However, the power source IC 6 does not necessarily need to be used also as a microcomputer monitor device, and a microcomputer monitoring function (microcomputer monitor device) may be provided separately from the power source IC 6. FIG. 9 is a flowchart presenting an example of disconnection processing in the case where such a microcomputer monitor device is provided. The flowchart presented in FIG. 8 is an example of the processing presented in FIG. 9 with the power source IC 6 used as the microcomputer monitor device.

The microcomputer monitoring function (microcomputer monitor device) means at least a function (device) having a watchdog timer function and capable of resetting the microcomputer 9 when judging a microcomputer abnormality.

In FIG. 9, when an abnormality occurs in the first disconnection processing function (1302) during the normal operation of the vehicle (1001), the microcomputer monitor device detects the abnormality of the first disconnection processing function (1303). The microcomputer monitor device having detected the abnormality of the first disconnection processing function turns off the high-voltage relay 5 (1304). Due to this, charging or discharging of the high-voltage battery 102 is stopped (1305). As a method of turning off the high-voltage relay 5, for example, the high-voltage relay 5 may be turned off by resetting the microcomputer 9 or stopping the power supply to the microcomputer 9 as described above, or the high-voltage relay 5 may be turned off by using the fail-safe signal 30 as in the configuration illustrated in FIG. 7.

Although various embodiments have been described above, the present invention is not limited thereto. Other aspects conceivable within the scope of the technical idea of the present invention are also included within the scope of the present invention. For example, in the above embodiments, the secondary battery management unit of a secondary battery to be mounted on a vehicle has been described as an example, but the present invention can also be applied to a secondary battery management unit of a secondary battery other than a secondary battery for a vehicle.

REFERENCE SIGNS LIST

1 battery management unit
5 high-voltage relay
6 power source IC
9 microcomputer
11 relay driver
22 reset signal
23, 24 diagnosis circuit
25 latch circuit
30 fail-safe signal
100 high-order controller
102 high-voltage battery
120 high-voltage relay group
121 main positive relay
122 precharge relay
123 main negative relay
124 charger positive relay
125 charger negative relay
130 inverter
131 charger
140 relay driver group
232, 501, 521 driver
502 diagnosis driver

The invention claimed is:

1. A battery manager, comprising:
a switch configured to turn on/off electrical connection between a battery and an external device; and
a disconnection controller having a first disconnection processing function of turning off the switch at a time of abnormality in the battery manager and a second disconnection processing function of detecting an abnormality of the first disconnection processing function and turning off the switch, wherein
the battery manager is configured to monitor and control the battery, wherein
the disconnection controller includes a microcomputer that detects overcharging and overdischarging of the battery, and a microcomputer monitor device configured to monitor the microcomputer, and as the second disconnection processing function, the microcomputer monitor device detects an abnormality of the first disconnection processing function and sets a flag, and the microcomputer detects the flag and causes the switch to perform an off operation.

2. The battery manager according to claim 1, wherein an abnormality of the first disconnection processing function is an abnormality of a reset signal for resetting the microcomputer.

3. The battery manager according to claim 2, wherein the reset signal is transmitted to the microcomputer when the microcomputer monitor device detects an abnormality of the first disconnection processing function, and the microcomputer having received the reset signal turns off the switch unit.

4. The battery manager according to claim 1, wherein the microcomputer monitor device is a power source IC configured to supply electric power to the microcomputer.

5. A battery manager, comprising:

a switch configured to turn on/off electrical connection between a battery and an external device; and a disconnection controller having a first disconnection processing function of turning off the switch at a time of abnormality in the battery manager and a second disconnection processing function of detecting an abnormality of the first disconnection processing function and turning off the switch, wherein the battery manager is configured to monitor and control the battery, wherein the disconnection controller includes a microcomputer configured to detect overcharging and overdischarging of the battery, and a microcomputer monitor device configured to monitor the microcomputer, and as the second disconnection processing function, the microcomputer monitor device stops power supply to the microcomputer.

6. The battery manager according to claim 5, wherein as the second disconnection processing function, the microcomputer monitor device detects an abnormality of the first disconnection processing function and causes the switch to perform an off operation not via the microcomputer.

* * * * *